(12) United States Patent
Makarov

(10) Patent No.: US 11,069,095 B1
(45) Date of Patent: Jul. 20, 2021

(54) TECHNIQUES FOR EFFICIENTLY SAMPLING AN IMAGE

(71) Applicant: NVIDIA Corporation, Santa Clara, CA (US)

(72) Inventor: Evgenii Makarov, Moscow (RU)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 16/890,104

(22) Filed: Jun. 2, 2020

(51) Int. Cl.
*G06T 7/40* (2017.01)
*G06T 11/00* (2006.01)
*G06T 3/40* (2006.01)

(52) U.S. Cl.
CPC .......... *G06T 11/001* (2013.01); *G06T 3/4007* (2013.01); *G06T 7/40* (2013.01); *G06T 2207/20081* (2013.01); *G06T 2207/20084* (2013.01)

(58) Field of Classification Search
CPC ....... G06T 11/001; G06T 3/4007; G06T 7/40; G06T 2207/20081; G06T 2207/2008; G09G 5/02; G09G 5/024; G09G 5/39
See application file for complete search history.

(56) References Cited

U.S. PATENT DOCUMENTS

| | | | | |
|---|---|---|---|---|
| 6,664,955 B1* | 12/2003 | Deering | ........... | G06T 3/4007 345/418 |
| 2003/0117409 A1* | 6/2003 | Lefebvre | ........... | G06T 11/40 345/581 |
| 2015/0049110 A1* | 2/2015 | Lum | ........... | G06T 15/503 345/600 |
| 2016/0035129 A1* | 2/2016 | Bolz | ........... | G06T 15/80 345/420 |

* cited by examiner

*Primary Examiner* — Antonio A Caschera
(74) *Attorney, Agent, or Firm* — Leydig, Voit & Mayer, Ltd.

(57) ABSTRACT

A sample mask is used to control which samples are used in a filtering operation such as bilinear filtering. A conventional filtering operation reads a set of samples based on a single coordinate and combines the samples to produce a filtered sample value. Such filtering operations are performed conventionally using fixed function units designed specifically to perform such filtering operations. However, for some applications, excluding one or more of the samples in producing a filtered sample value is desirable. In other applications, combining the samples using different weighting factors is also desirable. Techniques are disclosed herein for extending the capabilities of existing filtering units, for example, to exclude one or more samples in the filtering operation and for specifying different weighting rules for combining the samples.

24 Claims, 13 Drawing Sheets

Sample Mask 105 enabled disabled

TECHNIQUES FOR EFFICIENTLY SAMPLING AN IMAGE

TECHNICAL FIELD

The present disclosure relates to combining samples, and more particularly to selectively combining samples using sample masking.

BACKGROUND

A conventional filtering operation reads a set of nearest samples based on a coordinate and combines them to produce a filtered sample value. For example, in performing a bilinear filtering operation on a 2D texture map, four texels are obtained near the coordinate and a filtered texel value is generated by performing bilinear interpolation on them. Sometimes it is desirable to exclude one or more texels from the bilinear interpolation calculation. A conventional texture filtering pipeline does not provide a mechanism for excluding one or more texels. There is a need for addressing these and/or other associated issues.

SUMMARY

Techniques are disclosed for selectively combining samples based on a sample mask to produce a filtered value. In one embodiment, a method for selectively combining samples receives a filtering operation to be performed, a coordinate associated with a buffer, and a sample mask. The operation specifies a maximum number of samples to be obtained from the buffer for the coordinate. The sample mask specifies which of the maximum number of samples are to be combined to produce a filtered value according to the filtering operation. The sample mask may specify one, multiple, maximum, or less than the maximum number of samples that can be obtained for the operation. In an embodiment, the one or more samples are obtained from an image in a frame buffer. In an embodiment, the sample mask is produced using information associated with the image such as, for example, a corresponding Z-buffer (depth buffer) or G-buffer (geometry buffer).

DETAILED DESCRIPTION

Filtering operations are commonly performed on an image such as a texture map or on a rendered image stored in a frame buffer. Filtering is used for a variety of purposes such as to smooth out an image or to sample color values from an image. An image is typically represented as a collection of color values on a two-dimensional plane. Each color value represents the color of the image at a specific location on the two-dimensional plane. The location is typically specified as a two-dimensional coordinate such as (X, Y), where X is the location along the x-axis of the plane and Y is the location along the y-axis of the plane. Typically, an image stores only color values at (X, Y) locations where X and Y are whole numbers (e.g., at locations (2, 3), (4, 5), (3, 4), etc.). To derive or sample color values of an image at other positions (e.g., at locations (2.4, 3.2)), bilinear filtering is commonly used. In bilinear filtering, the four color values (e.g., also referred to as sample values or texels) stored in the image that are nearest to the location being sampled are obtained and combined to produce a single filtered value.

Figure 1A:
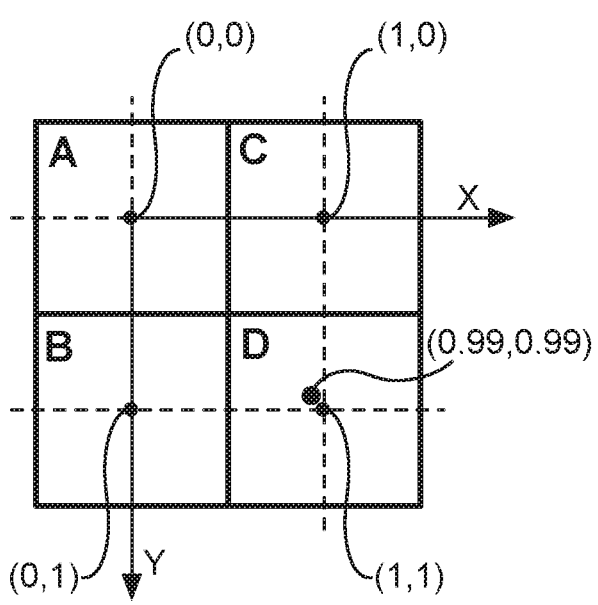
FIG. 1A illustrates an exemplary diagram of a portion of an image.

For example, FIG. 1A shows four color values stored for an image. Color value A is stored for location (0, 0), color value B is stored for location (1, 0), color value C is stored for location (0, 1), and color value D is stored of location (1, 1) of the image. To obtain or sample a color value at location (0.99, 0.99), bilinear filtering is commonly performed. First, the four colors that are nearest to the sampling location (0.99, 0.99) are retrieved from storage (e.g., DRAM or cache) for the image. With reference to FIG. 1A, the four nearest color values to sampling location (0.99, 0.99) are A, B, C, and D. Bilinear filtering is then performed by computing the amount of contribution the colors A, B, C and D would have at point (0.99, 0.99).

As one example, the single filtered color value S at location (0.99, 0.99) may be computed as follows:

$$S = A*weightA + B*weightB + C*weightC + D*weightD, \quad \text{(Eq. 1)}$$

where weightA=$(1-x)*(1-y)$, weightB=$x*(1-y)$, weightC=$(1-x)*y$, and weightD=$x*y$. For the position (0.99,0.99), the weight values would be weightA=0.001, weightB=0.0099, weightC=0.0099, and weightD=0.9801. The color value D has the greatest weight and therefore has the greatest contribution to S. Color value D is also the closest color to location (0.99, 0.99). Conventionally, a color value is composed of multiple color component values (e.g., red, green, and blue) and each color component value is scaled by the weights separately and summed to produce a resulting color component value of S.

Figure 1B:
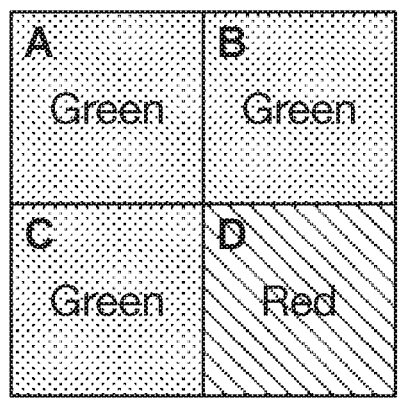
FIG. 1B illustrates an exemplary diagram of the color values corresponding to FIG. 1A.

FIG. 1B illustrates the color values of A, B, C, and D corresponding to FIG. 1A. As shown in FIG. 1B, colors A, B, and C are green and color D is red. As noted above, a color value is typically represented with one or more component color values. One typical way of representing a color value is to store the red, green, and blue components of the color value separately as a triple (R, G, B), where R is the value of the red component, G is the value of the green component, and B is the value of the blue component. Typically, each of the red, green, and blue color components ranges from 0.0 to 1.0, where 0.0 indicates that the color component does not contribute to the color value at all and 1.0 indicates that the color component fully contributes to the color value. Using such a representation, A, B, and C can be represented as RGB color values (0.0, 1.0, 0.0) and D can be represented as RGB color value (1.0, 0.0, 0.0). As noted above, the color value S at location (0.99, 0.99) is computed using the weight values weightA=0.001, weightB=0.0099, weightC=0.0099, and weightD=0.9801. Accordingly, the resulting S color value would have the RGB color value of (0.9801, 0.0199, 0.0), which is a color value that is mostly red with a bit of green mixed in.

Conventionally, bilinear filtering is performed using a fixed function hardware in a graphics processing unit (GPU). Such fixed function units are commonly referred to as a texture unit. A texture unit is conventionally first configured to operate on a particular image (e.g., such as a texture map or an image in a frame buffer). Thereafter the texture unit receives a two-dimensional coordinate (e.g., a coordinate such as (3.4, 0.99)) and the texture unit provides a color value of the image at the location specified by the coordinate. The texture unit can directly return values stored in the image which are closest to the texture coordinate provided (e.g., such as at coordinate (0, 1) of the image shown in FIG. 1A). Alternatively, for better quality (e.g., continuous or smooth color), the texture unit may apply bilinear filtering to four closest texels. But conventional texture units do not have any mechanism for omitting one or more of the four color values when sampling or deriving the color value at the specified location. Hence in applications when only two or three color values should be combined to derive the color value at the specified location, conventional texture units cannot be utilized to perform that combination. Instead, each of the two or three color values must be obtained and then manually combined to produce the desired resulting color value. However, this operation may require extra register space to store intermediate data for all of the samples and then additional mathematical computations for correct sample weighting. Doing so is inefficient. Embodiments disclosed herein address this and other related issues.

Figure 1C:
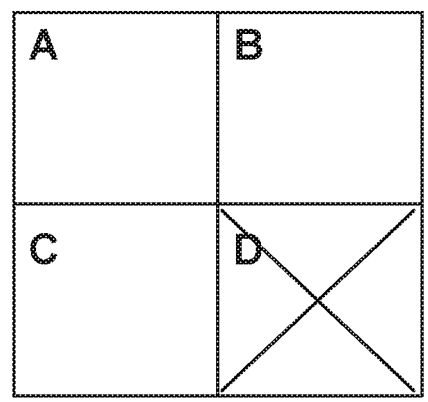
FIG. 1C illustrates an exemplary sample mask.
Figure 1C:
Figure 1C:

FIG. 1C illustrates an exemplary sample mask for indicating the color values that should be included or omitted when the four nearest color values in FIG. 1B are to be combined to compute a color value for the coordinate (0.99, 0.99) shown in FIG. 1A. In the example shown in FIG. 1C, sample mask 105 indicates that colors A, B, and C should be used to compute the color value at (0.99, 0.99) but color D should not be used. Although FIG. 1C depicts sample mask 105 pictorially, sample mask 105 is preferably represented as a 4-bit mask, with each bit corresponding to each of the four color values that are nearest to location where a color value is sought be obtained. Each bit indicates whether the corresponding color value should be used in computing the color at the specified coordinate. For example, a bit value of 1 may indicate that the corresponding color value is "enabled" and should be used in the computation. Whereas a value of 0 may indicate that the corresponding color value is "disabled" (e.g., un-enabled) and should not be used. In other embodiments, the number of bits in the sample mask may be greater or less than four. Generally, the number of bits in the sample mask equals the number of color values nearest to a specified location that are to be used to compute a color value at the location. When a sample mask is used, the color value S' at a particular location may be computed as:

$$S'=(A*bA*\text{weight}A+B*bB*\text{weight}B+C*bC*\text{weight}C+D*bD*\text{weight}D)/N, \quad \text{(Eq 2)}$$

where $$N=bA*\text{weight}A+bB*\text{weight}B bC*\text{weight}C bD*\text{weight}D \quad \text{(Eq. 3)}$$

Each of the bA, bB, bC, and bD values is 1 if the sample mask indicates the respective color A, B, C, or D should be used in computing the color value S'. Each of the bA, bB, bC, and bD values is 0 if the sample mask indicates that the respective color A, B, C, or D should not be used in computing the color value S'. N is a normalization value that equals the sum of the enabled weight values. When N=0, S' may be set to NaN (not a number). When color value S' is represented by component color values, each of the component values may be separately computed. For the location (0.99,0.99) as shown in FIG. 1A, applying the sample mask of FIG. 1C results in a color value S' having a RGB value of (0.0, 1.0, 0.0). If the sample mask 105 is changed so that colors A, B, and C are to be omitted and color D is to be included in the computation of the color value S' at location (0.99, 0.99), S' would be computed to have a RGB value of (1.0, 0.0, 0.0). A sample mask such as 105 may be used to control which color values are combined to produce a resulting single filtered color value.

For some applications, it may be desirable to obtain color values at various locations in an image using only the nearest color values (also referred to herein as samples) that have certain properties. For example, for denoising, it may be preferable to combine only the nearest color values that are within a certain Z-value (depth value) of the Z-value at the location where a color value is sought. In such an instance, a sample mask could be created that enables only the samples that are within a desired Z-depth. For example, supposed color D of FIG. 1B has a Z-depth that is further from the camera as compared with the colors A, B, and C because colors A, B, and C correspond to an object closer to the camera and color D represents an object further away from the camera. If the Z-value for the location (0.99, 0.99) as shown in FIG. 1A is closer to the z-values of A, B, and C rather than the z-value of D, then the location (0.99, 0.99) may correspond to the object closer to the camera. In such an instance, a sample mask may be created to exclude color value D since location (0.99, 0.99) should likely have a color that is similar to the color of the closer object rather than the far object.

In another embodiment, the sample mask enables and disables samples based on other attributes, such as lighting (e.g., diffuse, specular, or shadow) or surface material (e.g., foliage or human skin) corresponding to the color values stored for the image. Generally, a sample mask may be used to filter any type of samples (not only color value samples) being combined, based on additional data that is not present in the data being sampled. For example, a sample mask may be generated based on depth values computed when an image is rendered. In another example, data corresponding to an image that is generated during the rendering of the image (e.g., data generated by ray-casting for diffuse lighting, specular highlights, shadows, etc.) may be used to create sample masks. Additionally, G-buffer data generated during rendering may also be used to create sample masks. One or more sample masks may be separately applied to the image to obtain color values that can be used to modify or generate new images.

Figure 1D:
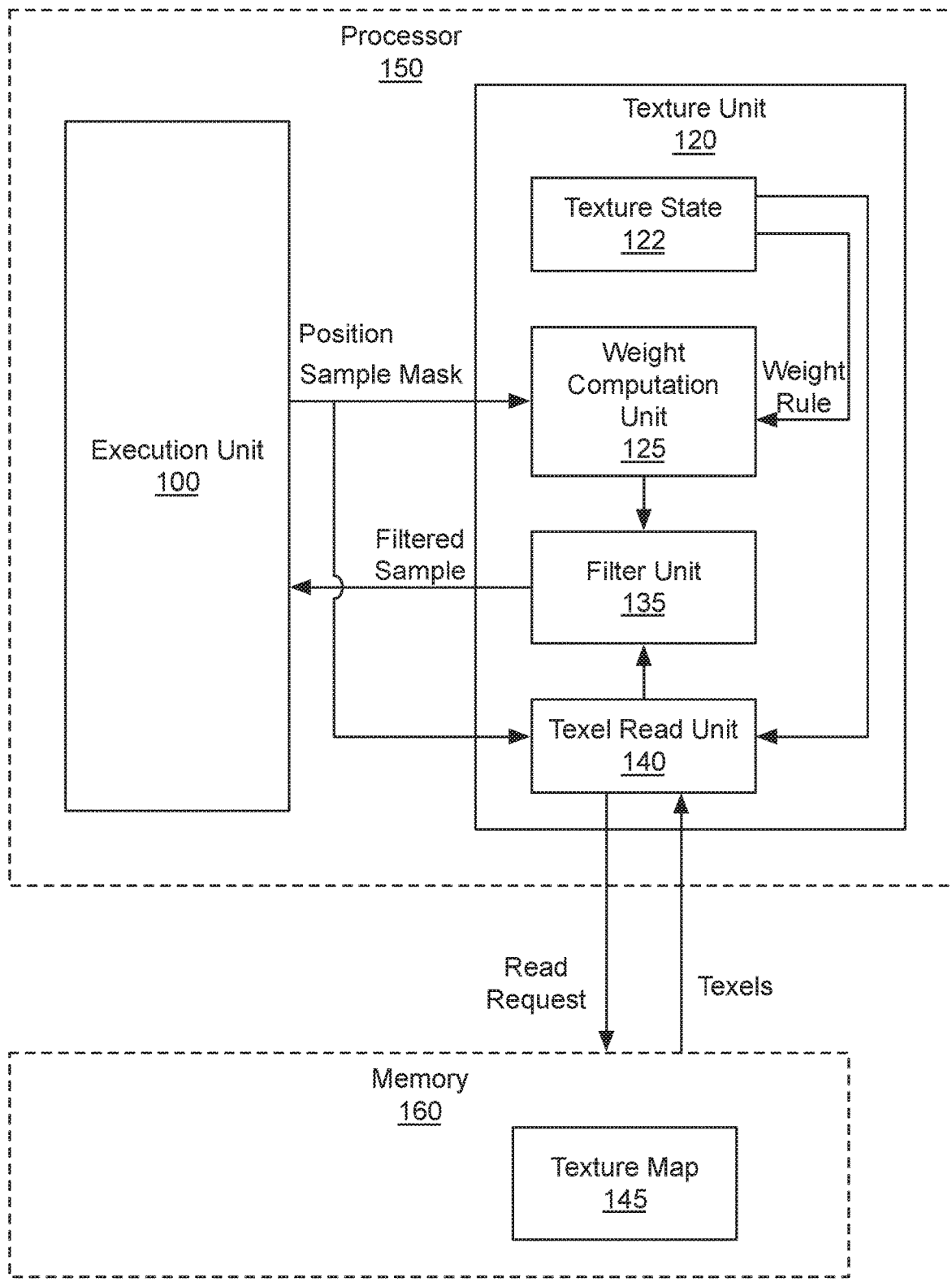
FIG. 1D illustrates an exemplary system including a processor and a memory for selectively combining samples according to a sample mask.

FIG. 1D illustrates an exemplary system, which includes a processor 150 and memory 160, for selectively combining color values (also referred to as texels herein) according to a sample mask. Processor 150 may be a GPU (graphics processing unit), CPU (central processing unit), FPGA (field programmable gate array), or any other type of processor. In an embodiment, processor 150 is the parallel processing unit 300 shown in FIG. 3.

Processor 150 includes execution unit 100 and texture unit 120. Processor 150 is coupled to memory 160 and executes instructions, including instructions to read and perform filtering operations on texels using sample masks. For example, a shader program may perform texture mapping operations that read texel quads (four nearest color values for a particular location) for bilinear, trilinear, and/or other types of texture filters. The instructions include one or more operands. In an embodiment, one of the operands is a position. In contrast with a conventional texture map instruction, a sample mask may also be specified by the instruction and provided to texture unit 120.

Texture unit 120 includes texture state 122, weight computation unit 125, texel read unit 140430, and filter unit 135. Texture state 122 stores state information that is used to configure weight computation unit 125 and texel read unit 140. The state information may be written to registers within texture state 122 by the execution unit 100. The state information may be provided to texture unit 120 by the execution unit 100. The state information may include a texture map identifier, base address, and other texture map format information that is used by texel read unit 140 to generate a read request. The state information may also include a weight rule that is provided to weight computation unit 125 to control how weights are computed.

Texel read unit 140430 generates a sample request to read a set of samples for the position from texture map 145. The texel read unit 140 converts the position into an address for one or more locations in texture map 145. The texture map 145 may be a frame buffer or buffer storing color or another type of data. In an embodiment, the sample mask is not provided with the position and the sample request reads the sample mask from memory 160.

To obtain a color value at a position in an image (such as a texture map or bitmap), execution unit 100 provides at least a position and sample mask to texture unit 120. The position and sample mask may be operands of an instruction. In an embodiment, the position specifies 2D coordinates for an image such as a texture map. Texel read unit 140 uses the position and state information to generate a memory address for a read request. A read request is output to memory 160 to read texels from an image or a texture map 145. Texel read unit 140 may be configured to use the sample mask to generate a read request only for the texels that are enabled by the sample mask. In one embodiment, texels that are not enabled, according to the sample mask, are not retrieved or read from any on-chip cache or off-chip memory. In another embodiment, all of the nearest texels in a quad are retrieved and the sample mask is used to remove one or more texels to compute the filtered sample. Texel read unit 140 may be configured to format the texels retrieved from memory 160 as needed to align with the sample mask for processing by filter unit 135. Texture state 122 may provide information defining a correspondence between the bits of the sample mask and the texels in the quad.

In an embodiment, the read request is transmitted to the memory via an interface and/or cache(s). For example, the read request may be transmitted to memory 160 via a memory management unit 490 shown in FIG. 4A. The texels may be returned from memory 160 to texel read unit 140 or directly to filter unit 135.

Weight computation unit 125 receives the position and sample mask and computes weights. The weights used to filter the texels may be calculated using a function that is predefined or programmed. The sample mask determines which texels will contribute to the filtered sample and a weight rule may be used to control the contribution provided by each enabled texel. For example, as previously described, bilinearly interpolated weights may be computed when a weight rule specifies bilinearly interpolated filter weights for conventional texture mapping operations. In another example, a uniform weight rule applies a uniform weight for each of the enabled samples. For example, when two of four texels in the quad are disabled by the sample mask, the remaining two texels are each weighted by 0.5. Similarly, when one of four texels in the quad is disabled by the sample mask, the remaining three texels are each weighted by 0.33. A weight rule may be fixed, programmed, or specified by an instruction implicitly (e.g., a separate instruction is defined for each weight rule) or as a separate operand.

Filter unit 135 receives the weights and texels and computes a filtered sample. Each component for a texel is scaled by the weight computed for the texel to produce scaled values. The scaled values may be produced in parallel or serially. The scaled values for the texels are summed for each one of the components to produce components for the filtered sample. In an embodiment, filter unit 135 receives the sample mask and produces scaled values only for enabled texels. The filtered sample may be stored to memory 160 and/or processed within the processor 150.

Figure 1E:
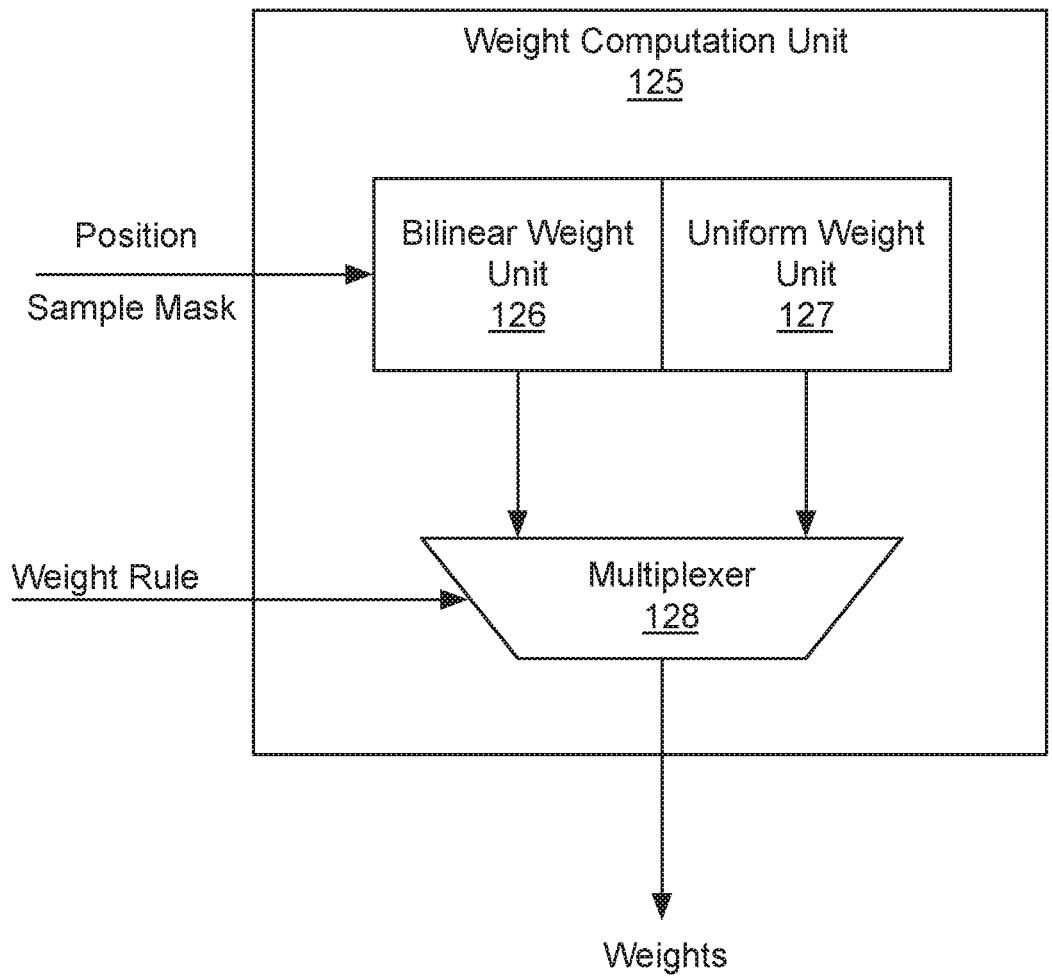
FIG. 1E illustrates an exemplary weight computation unit within the processor of FIG. 1D.

FIG. 1E illustrates is an exemplary weight computation unit 125 within the processor 150 of FIG. 1D. Weight computation unit 125 includes bilinear weight unit 126, uniform weight unit 127, and multiplexer 128.

Bilinear weight unit 126 computes bilinear weights for texels that are enabled by the sample mask. Assuming a binary sample mask, the weight for a texel is set to zero when the texel's mask bit is not enabled. The enabled weights are computed using the position, where weightA=$(1-x)*(1-y)$, weightB=$x*(1-y)$, weightC=$(1-x)*y$, and weightD=$x*y$. Alternatively, bilinear weight unit 126 may compute all of the bilinear weights and then apply the sample mask to set disabled weights to zero. When bilinear filtering is used in filter unit 135 to generate a filtered sample S', bilinear weight unit 126 may divide each computed weight by N. When N=0, the weight computation unit 125 may signal filter unit 135 to set S' to NaN (not a number). The bilinear weights may be computed in parallel or serially. The weights computed by bilinear weight unit 126 are input to multiplexer 128. When the bilinear interpolated weight rule is used, uniform weight unit 127 may be disabled.

Uniform weight unit 127 computes uniform weights based on the sample mask. When the uniform weight rule is used, bilinear weight unit 126 may be disabled. The uniform weight for each enabled texel may be computed as the reciprocal of the number of texels that are enabled according to the sample mask. The uniform weight for each disabled texel is set to zero. The weights computed by uniform weight unit 127 are input to multiplexer 128.

Multiplexer 128 receives the computed weights along with the weight rule. The weight rule is used to select either the bilinear or uniform weights for output to filter unit 135. In another embodiment, one or more additional weight rules are defined and one or more additional weights may be computed and input to multiplexer 128. In an embodiment, weights are received instead of, or in addition to, a sample mask. The weights may be specified as operands of an instruction and execution unit 100 provides the weights to texture unit 120.

A conventional texture unit is configured to calculate bilinearly interpolated weights and generate a filtered sample using the bilinearly interpolated weights. The conventional weight computation may be replaced with weight computation unit 125 to use a sample mask to selectively control which texels are filtered. Greater flexibility is also provided using a weight rule to control the contribution of the selectively enabled texels.

When an image is rendered, additional data may also be generated that is used to produce sample masks. Generally, a sample mask may be used to filter any type of samples, not only color values, based on additional data that is not present in the data being sampled. The additional data may include at least Z (depth) values, attributes, or surface material information. The additional data may be processed according to a shader program executed by execution unit 100 to dynamically generate sample masks to filter texels. Alternatively, the additional data may be processed to generate one or more sample mask buffers that are stored in memory and then read from memory to filter texels. The sample filter unit 120 is used to sample at least a portion of the image (stored as a texture map) using one or more sample masks to control which samples contribute (or not) to the filtered image. More specifically, in an embodiment, different sample masks may be used to filter a portion of the image and produce a layer. The layers may then be combined to produce the filtered image.

Figure 2A:
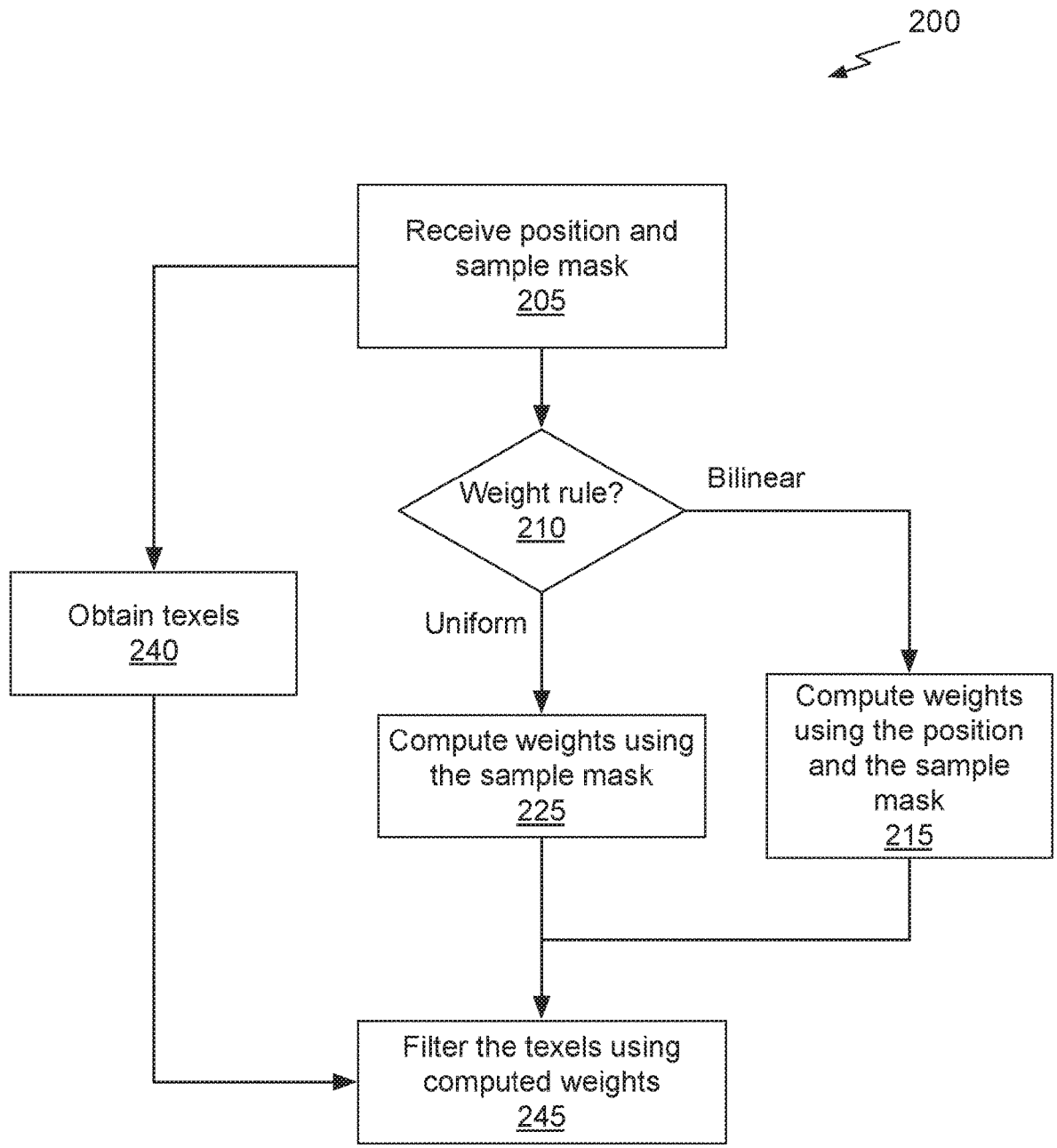
FIG. 2A illustrates an exemplary flowchart of a method for selectively combining samples according to a sample mask.

FIG. 2A illustrates an exemplary flowchart of a method 200 for selectively combining samples according to a sample mask. At step 205, texel read unit 140 receives a position and sample mask. At step 240, the position is used to obtain a set of samples (e.g., texels) from texture map 145. In an embodiment, only texels enabled according to the sample mask are read from texture map 145. A predetermined number of samples nearest the position (e.g., four in a quad) may be included in the set of samples. In an embodiment, the number of samples in the set is determined by a footprint centered on the position or a radius defining a region including the position (e.g., image region). Because weights of texels that are not enabled to the sample mask are set to zero in the weight computation unit 125, disabled texels that are read from memory (or not) will not contribute to the filtered sample. Therefore, it is not necessary for texel read unit 140 to set the disabled texels to zero. In another embodiment, instead of setting weights for disabled texels to zero in weight computation unit 125, the disabled texels are set to zero by texel read unit 140.

In an embodiment, instead of receiving the sample mask at step 205, texel read unit 140 receives an additional position that is used to read the sample mask from memory 160. In another embodiment, the sample mask is not received at step 205 and the position is used to read the sample mask from memory 160.

At step 210, weight computation unit 125 determines if the bilinear weight rule is used, and, if so, at step 215, weight computation unit 125 computes weights using the position and sample mask so that weights corresponding to disabled texels are set to zero. If, at step 210, weight computation unit 125 determines that the uniform weight rule is used, then, at step 225, weight computation unit 125 computes weights using the sample mask. In other embodiments, additional weight rules may be used to compute the weights. Weight computation unit 125 provides the computed weights to filter unit 135.

Step 240 may be performed in parallel with steps 210 and 225 and/or 215. At step 245, filter unit 135 computes a filtered sample by combining the samples according to the computed weights. The samples may be combined by scaling each sample by the corresponding computed weight and summing the resulting products.

Figure 2B:
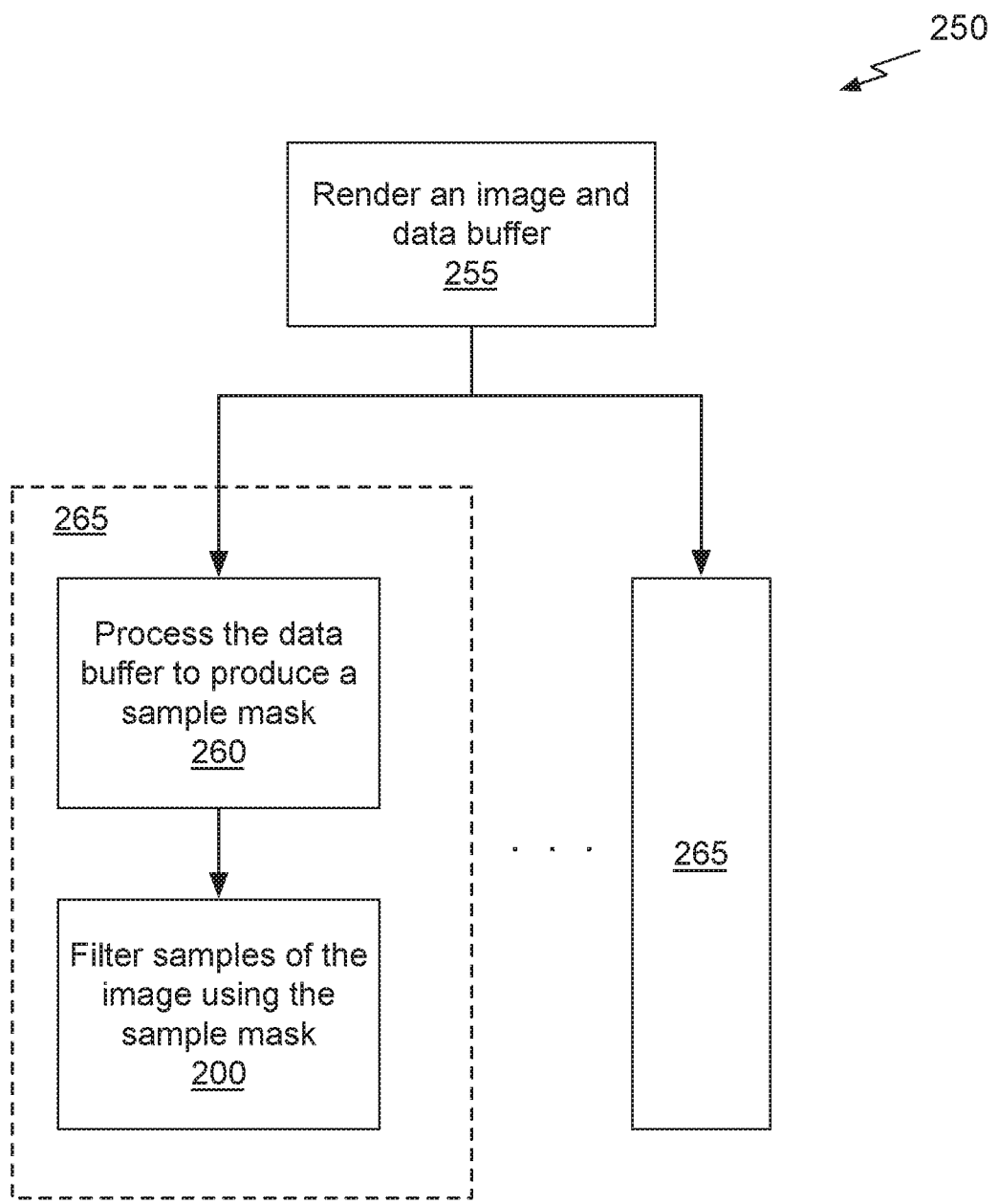
FIG. 2B illustrates an exemplary flowchart of a method for producing the sample masks for filtering samples of an image.

FIG. 2B illustrates an exemplary flowchart of a method 250 for producing sample masks for filtering samples of an image. At step 255, an image and data are rendered. The image and data may each be stored in a respective buffer in memory. A multithreaded processor, may be configured to filter texels for multiple positions in parallel. For example, execution unit 100 within processor 150 may include one or more programmable streaming multiprocessors (SMs) 440 of FIGS. 4A and 5A that each include at least one texture unit 120.

Step 265 includes steps 260 and 200 and may be executed in parallel for multiple positions. At step 260, the data buffer is processed to produce a sample mask. At step 200, the processor 150 filters samples of the image using the sample mask. Step 265 may be repeated for different types of data to produce multiple layers that are combined to produce a filtered image.

Sample masks may be dynamically generated for each quad at step 260. For example, a sample mask may be computed based on depth values so that only samples within a threshold depth the depth at a position contribute to the filtered sample for the position. In another example, a sample mask may be computed based on a surface material attribute so that only samples that have a certain attribute (e.g. material corresponding to human skin) contribute to the filtered sample.

In an embodiment, when a dynamic sample mask generation technique is used, the data buffer is read in parallel with the texels and the sample mask is generated for each quad. For example, a position may be used to read the quad (e.g., set of samples) from a frame buffer and data from a Z-buffer. The Z value corresponding to the position (position Z value) may be compared with the Z values for each sample. Sample mask bits are then enabled for sample Z values within a defined range of the position Z and are disabled for sample Z values outside of the defined range.

A conventional texture unit may be modified to selectively enable/disable samples that are combined according to a filter function to produce a filtered sample. The sample mask controls which samples are enabled/disabled and the sample mask may also be used to compute weights input to the filter function. Extended texture instructions may be used to provide a sample mask in addition to a position for the filtered sample. The sample mask may be provided explicitly as an operand, read from a sample buffer using the position, or read from a sample buffer using an additional position that is provided as an operand. Extended texture instructions may also include an operand defining a weight rule.

One or more weight rules may be defined to compute filter weights based on at least one of a position and sample mask. The sample mask may be generated using data that is separate from the samples. For example, the samples may be a first type of data (e.g., color) and the data used to generate the sample mask may be a second type of data (e.g., depth). The samples may be read from a frame buffer and the data used to generate the sample mask may be read from a depth (Z-buffer) or stencil buffer. In an embodiment, the filter unit 135 performs trilinear filtering and a different sample mask may be used for each mip (multum in parvo) level.

Image filtering performance may be improved and memory traffic may be reduced by using sample masks within the texture unit to control which samples contribute to each filtered sample. A weight rule may be used to control the contribution provided by each texel that is enabled according to the sample mask. In contrast, performing image filtering using conventional techniques typically consumes more memory bandwidth and register space for reading and processing the samples.

Parallel Processing Architecture

Figure 3:
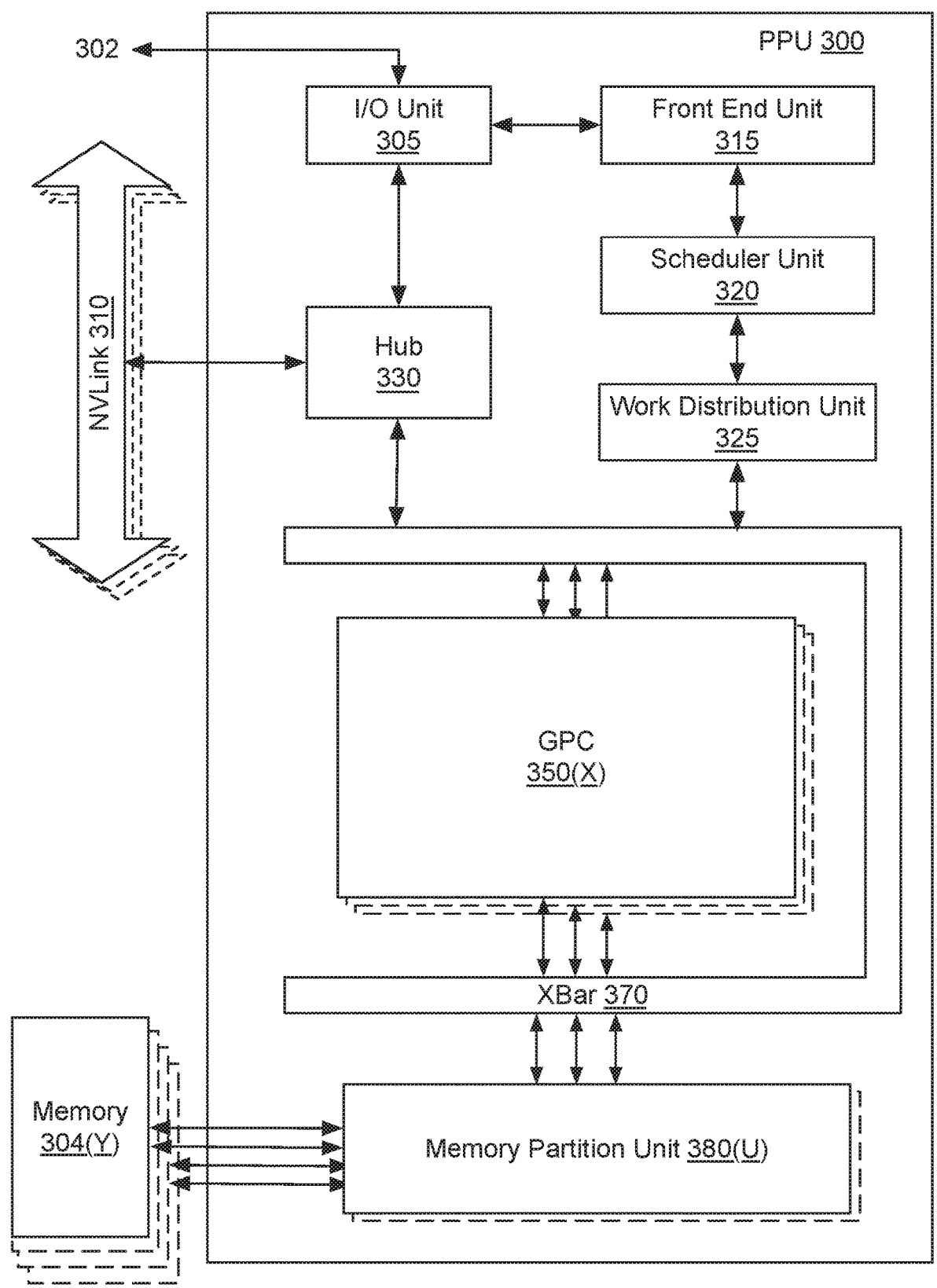
FIG. 3 illustrates an exemplary parallel processing unit.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory 304 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 300 or CPU via the NVLink 310. In an embodiment, the PPU 300 includes a number U of memory partition units 380 that is equal to the number of separate and distinct memory devices of the memory 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
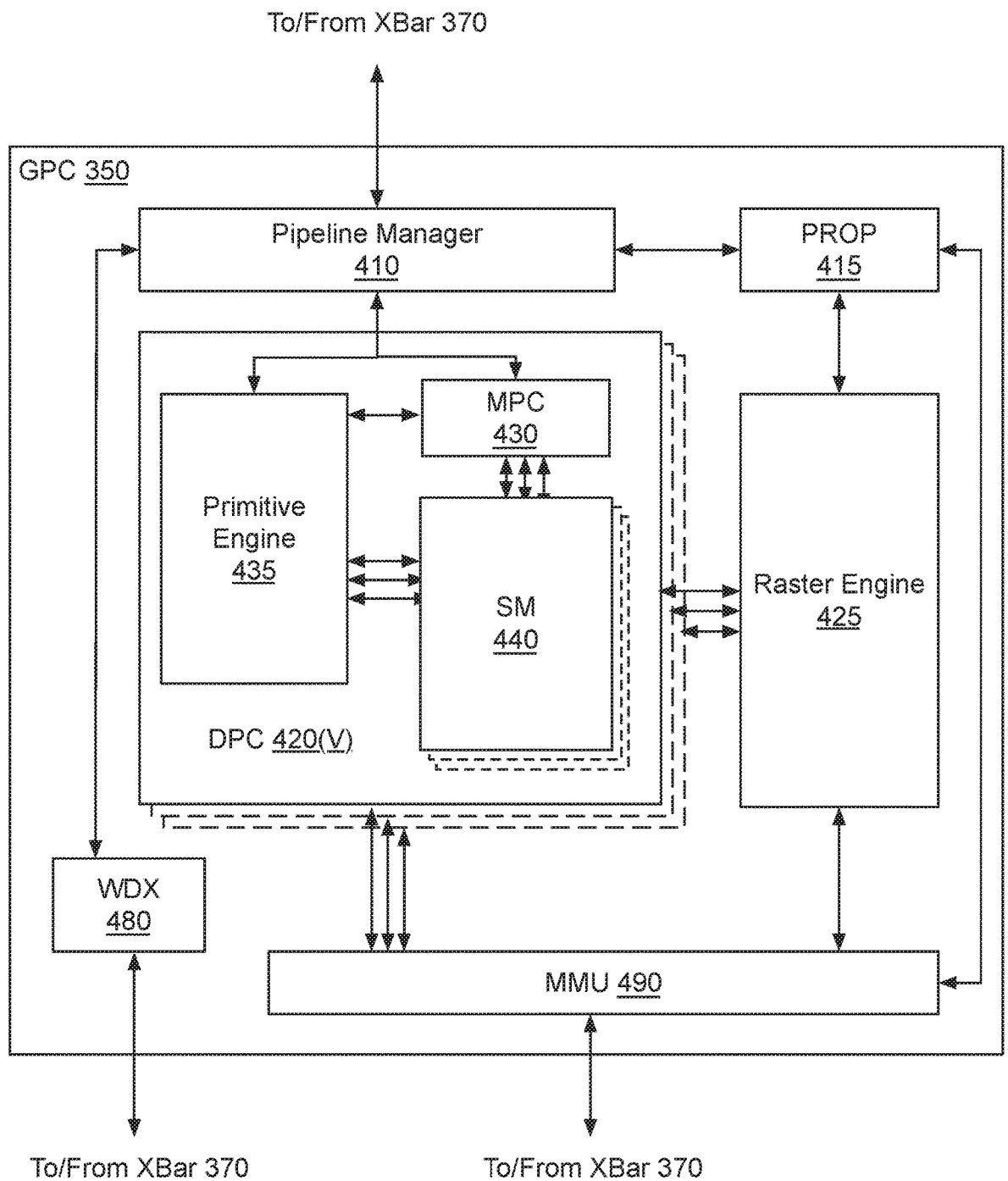
FIG. 4A illustrates an exemplary general processing cluster within the parallel processing unit of FIG. 3.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
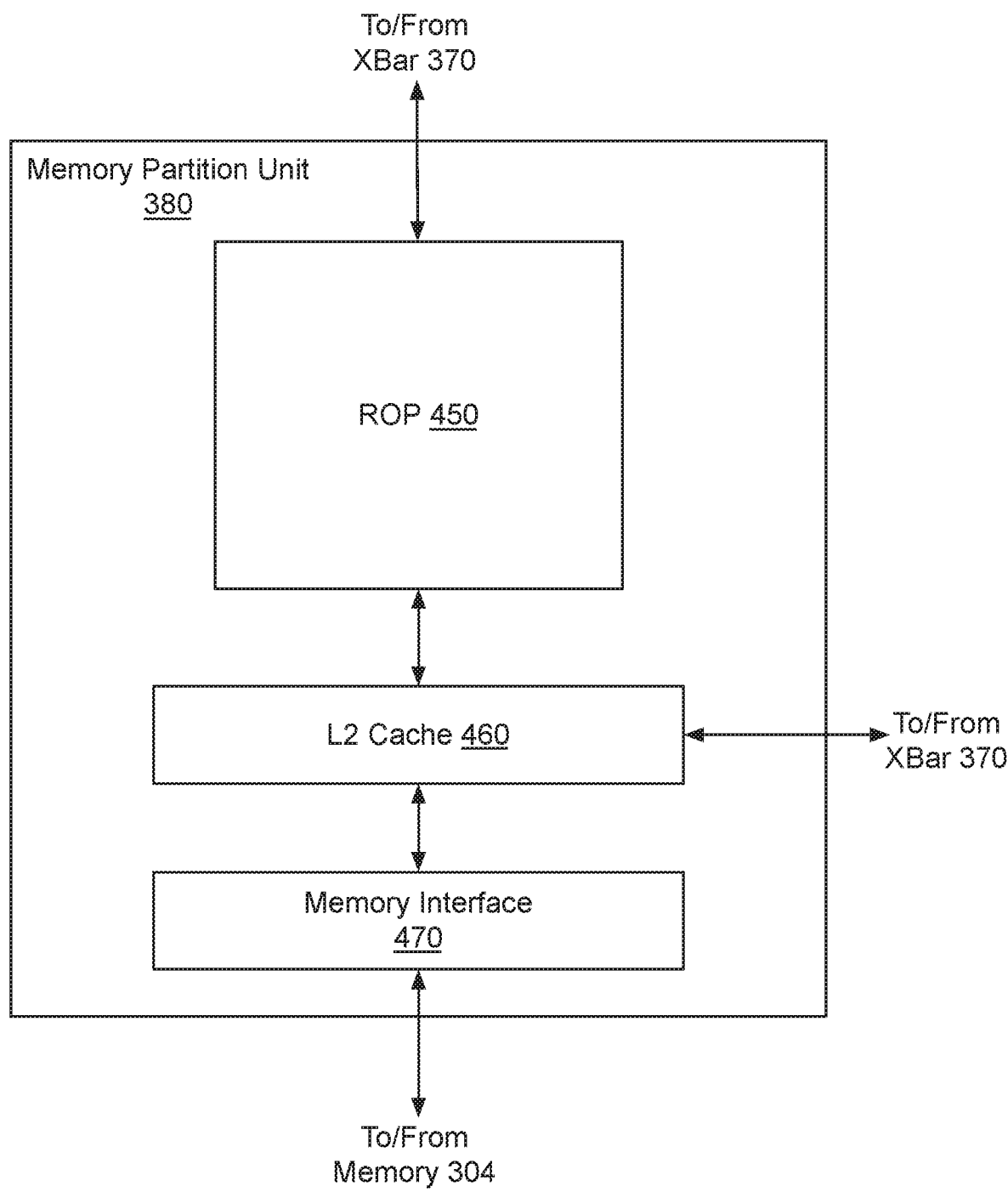
FIG. 4B illustrates an exemplary memory partition unit of the parallel processing unit of FIG. 3.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device of the memory 304. For example, PPU 300 may be connected to up to Y memory devices, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
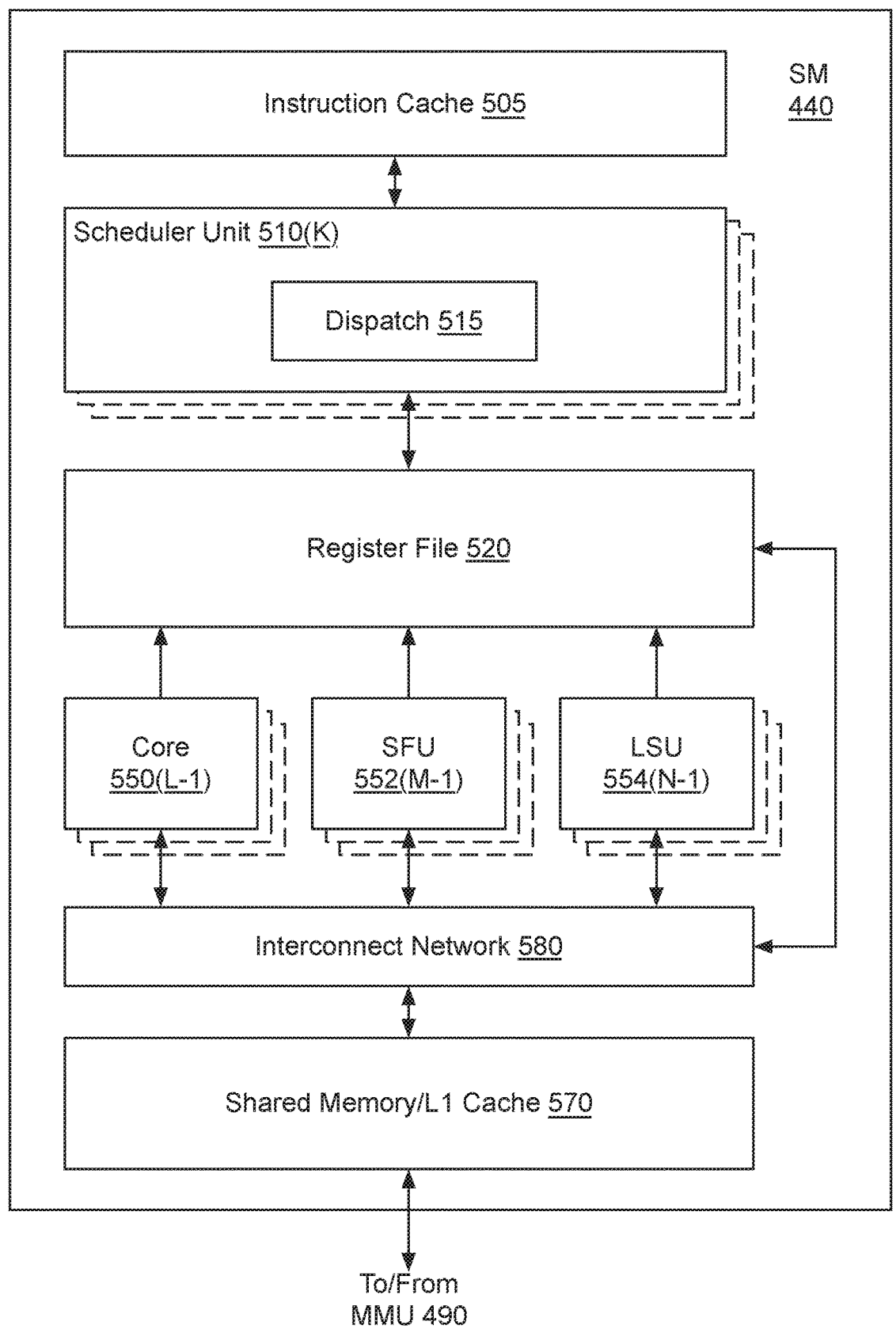
FIG. 5A illustrates an exemplary streaming multi-processor of FIG. 4A.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit, such as texture unit 120, configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 570. The texture units implement texture operations such as filtering operations using mip-maps (e.g., texture maps of varying levels of detail). In an embodiment, each SM 340 includes two texture units.

Each SM 440 also comprises NLSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 304, a reduced instruction set computer (RISC) CPU, a memory management unit (MMU), a digital-to-analog converter (DAC), and the like.

In an embodiment, the PPU 300 may be included on a graphics card that includes one or more memory devices. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
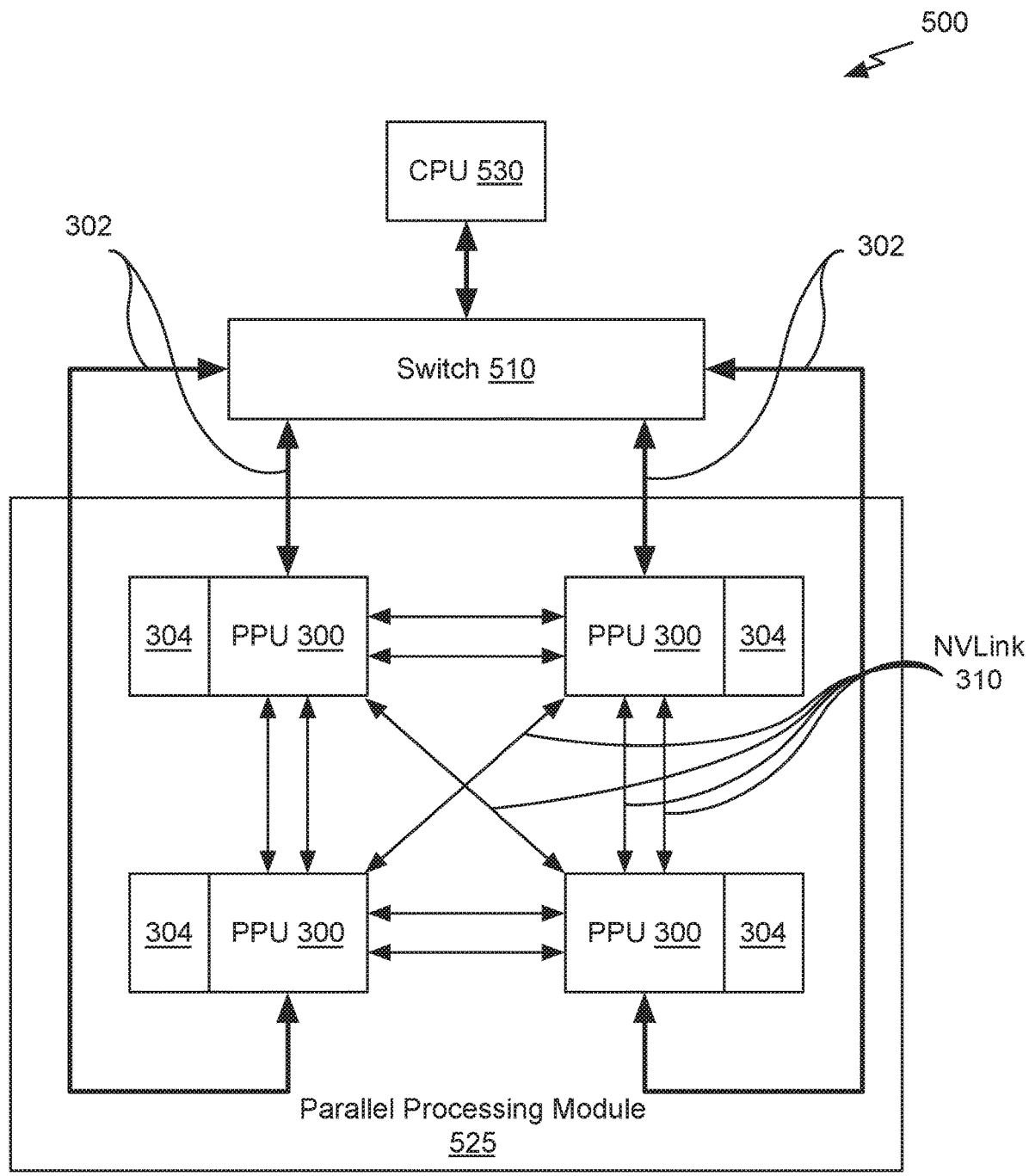
FIG. 5B illustrates an exemplary diagram of a processing system implemented using the PPU of FIG. 3.

FIG. 5B is a conceptual diagram of a processing system 500 implemented using the PPU 300 of FIG. 3, in accordance with an embodiment. The exemplary system 565 may be configured to implement the method 200 shown in FIG. 2. The processing system 500 includes a CPU 530, switch 510, and multiple PPUs 300, and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
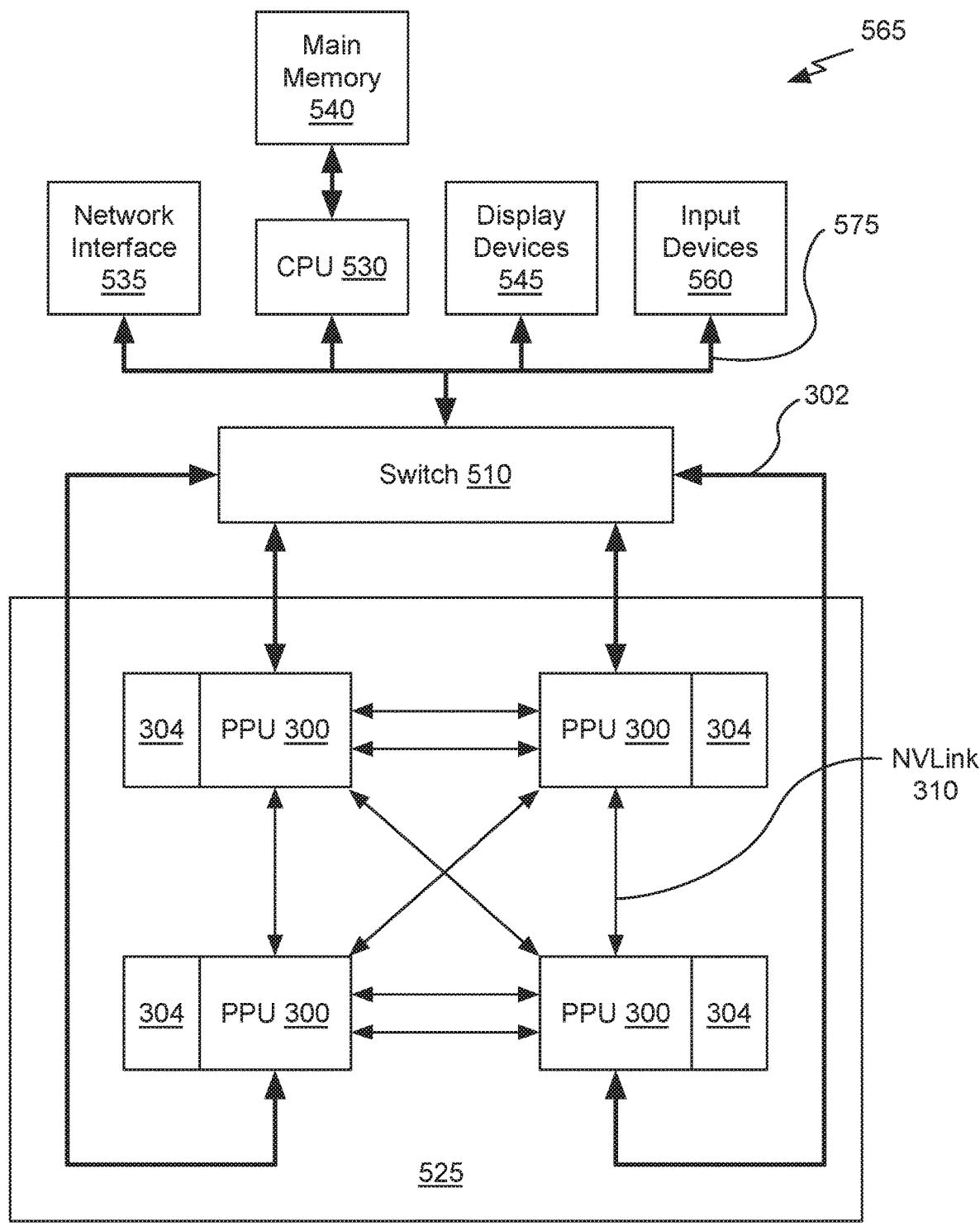
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 200 shown in FIG. 2.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (e.g., pixel data for each of the pixels of the display).

An application writes model data for a scene (e.g., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (e.g., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
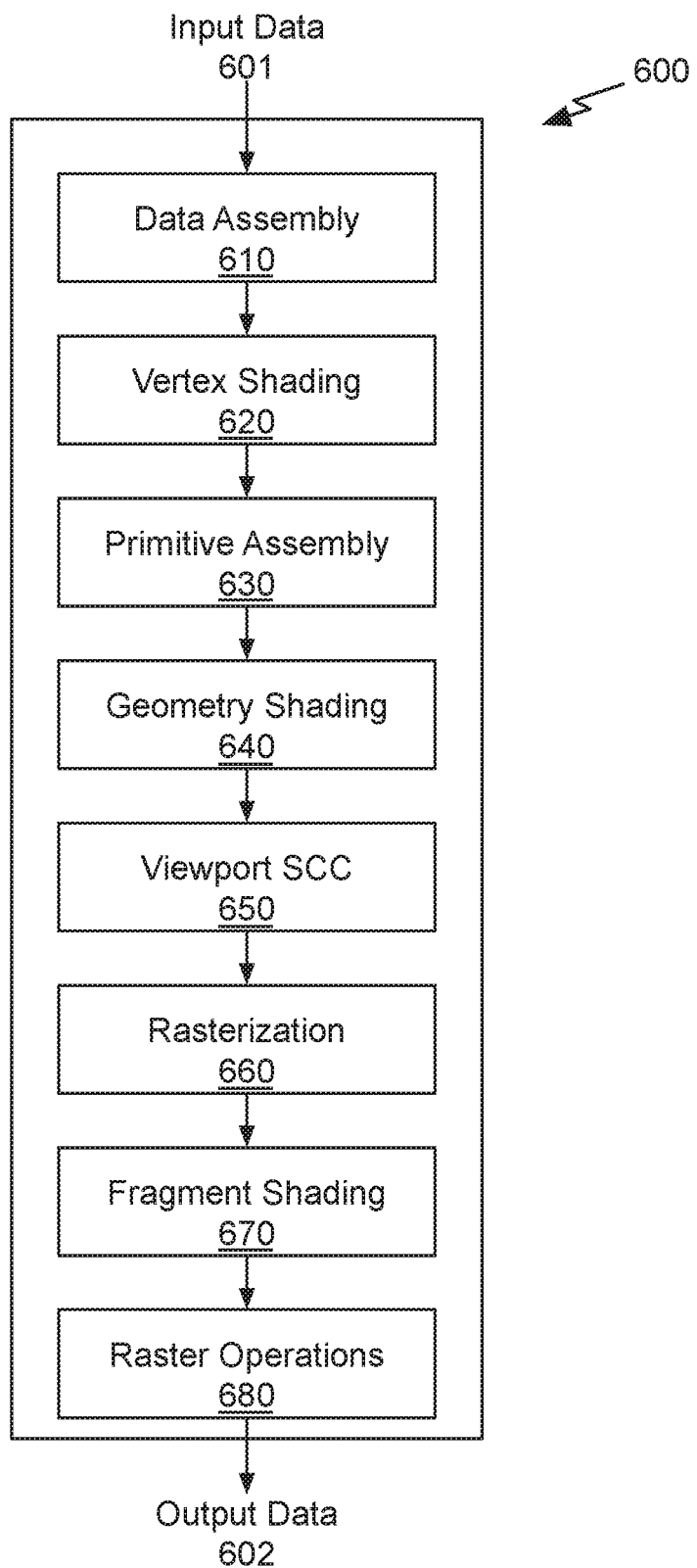
FIG. 6 illustrates an exemplary diagram of a graphics processing pipeline implemented by the PPU of FIG. 3.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 300) may also launch other kernels on the PPU 300 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 300. It will be appreciated that results from one kernel may be processed by one or more intervening fixed function hardware units before being processed by a subsequent kernel on an SM 440.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Furthermore, images generated applying one or more of the techniques disclosed herein may be used to train, test, or certify deep neural networks (DNNs) used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method for selectively combining samples in an operation, comprising:
   receiving an operation to perform and a coordinate associated with a buffer;
   obtaining one or more samples from the buffer corresponding to the coordinate, wherein the operation specifies a maximum number of samples and a sample mask specifies which samples of the maximum number of samples are enabled for the operation, wherein a number of the samples that are enabled is less than the maximum number of samples; and
   combining the one or more enabled samples according to the operation to produce a single filtered value.

2. The computer-implemented method of claim 1, wherein the step of obtaining one or more samples comprises:
   retrieving from the buffer the one or more enabled samples while not retrieving from the buffer any un-enabled samples.

3. The computer-implemented method of claim 1, wherein the step of obtaining one or more samples comprises:
   retrieving from the buffer the maximum number of samples associated with the operation.

4. The computer-implemented method of claim 1, wherein the operation is bilinear interpolation, the maximum number of samples is 4, the sample mask is a 4-bit value, the buffer is a bitmap or texture map, and the coordinate is a 2D coordinate specifying a location in the bitmap or the texture map.

5. The computer-implemented method of claim 1, wherein the buffer is a frame buffer, and wherein the sample mask is based on a Z-buffer or G-buffer corresponding to the frame buffer.

6. The computer-implemented method of claim 1, further comprising:
receiving a weight rule, and
wherein the step of combining the one or more enabled samples comprises:
scaling the one or more enabled samples based on the weight rule.

7. The computer-implemented method of claim 6, wherein each scaled sample or weight is divided by a normalized value, wherein the normalized value is a sum of the weights for the one or more enabled samples.

8. The computer-implemented method of claim 1, wherein the steps of receiving, obtaining, and combining are performed by a texture unit.

9. The computer-implemented method of claim 1, wherein the sample mask is based on material attributes associated with the coordinate.

10. The computer-implemented method of claim 1, wherein the combining the one or more samples comprises:
computing a uniform weight for each of the one or more enabled samples;
scaling each of the one or more enabled samples by the uniform weight to produce scaled samples; and
summing the scaled samples to produce the single filtered value.

11. The computer-implemented method of claim 1, wherein the steps of receiving, obtaining, and combining are performed on a server or in a data center to generate an image, and the image is streamed to a user device.

12. The computer-implemented method of claim 1, wherein the steps of receiving, obtaining, and combining are performed to generate an image used for training, testing, or certifying a neural network employed in a machine, robot, or autonomous vehicle.

13. A system, comprising:
a processor coupled to a memory and configured to:
receive an operation to perform and a coordinate associated with a buffer;
obtain one or more samples from the buffer corresponding to the coordinate, wherein the operation specifies a maximum number of samples and a sample mask specifies which samples of the maximum number of samples are enabled for the operation, wherein a number of the samples that are enabled is less than the maximum number of samples; and
combine the one or more enabled samples according to the operation to produce a single filtered value.

14. The system of claim 13, wherein the processor is further configured to obtain the one or more samples by:
retrieving from the buffer the one or more enabled samples while not retrieving from the buffer any un-enabled samples.

15. The system of claim 13, wherein the processor is further configured to obtain the one or more samples by:
retrieving from the buffer the maximum number of samples associated with the operation.

16. The system of claim 13, wherein the operation is bilinear interpolation, the maximum number of samples is 4, the sample mask is a 4-bit value, the buffer is a bitmap or texture map, and the coordinate is a 2D coordinate specifying a location in the bitmap or the texture map.

17. The system of claim 13, wherein the buffer is a frame buffer, and wherein the sample mask is based on a Z-buffer or G-buffer corresponding to the frame buffer.

18. The system of claim 13, wherein the processor is further configured to:
receive a weight rule, and
wherein combining the one or more enabled samples comprises:
scaling the one or more enabled samples based on the weight rule.

19. The system of claim 18, wherein each scaled sample or weight is divided by a normalized value, wherein the normalized value is a sum of the weights for the one or more enabled samples.

20. The system of claim 13, wherein the processor comprises a texture unit that is configured to perform the receiving, obtaining, and combining.

21. The system of claim 13, wherein the sample mask is based on material attributes associated with the coordinate.

22. The system of claim 13, wherein the processor is further configured to combine the one or more samples by:
computing a uniform weight for each of the one or more enabled samples;
scaling each of the one or more enabled samples by the uniform weight to produce scaled samples; and
summing the scaled samples to produce the single filtered value.

23. The system of claim 13, wherein the processor generates an image using the single filtered value, the processor is a part of a server or a data center, and the image is streamed to a user device.

24. The system of claim 13, wherein the processor generates an image using the single filtered value, and the image is used for training, testing, or certifying a neural network employed in a machine, robot, or autonomous vehicle.

* * * * *